Figure 1:
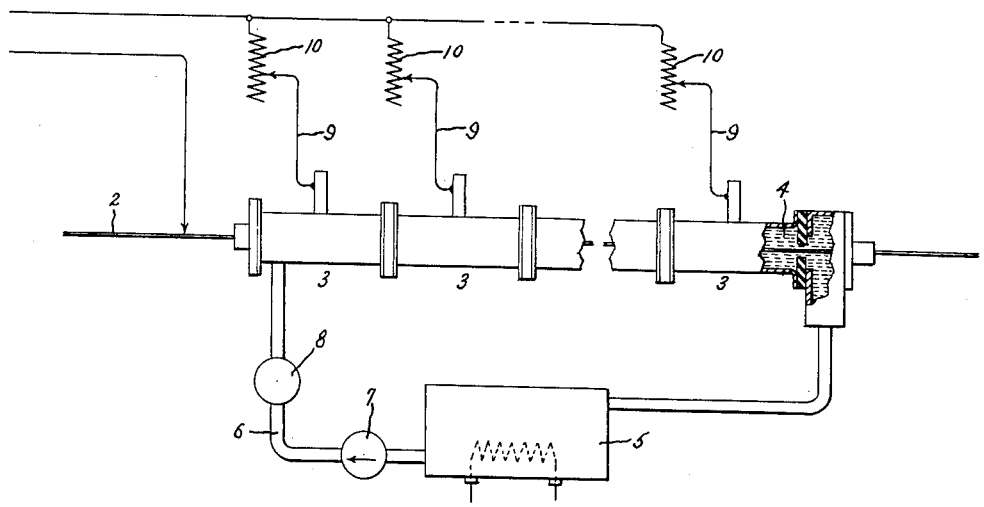

May 15, 1956      D. T. HURD      2,745,898

INSULATED ELECTRIC CONDUCTORS

Filed Sept. 20, 1952

Inventor:
Dallas T. Hurd,
by Paul A. Frank
His Attorney.

United States Patent Office 2,745,898
Patented May 15, 1956

2,745,898

INSULATED ELECTRIC CONDUCTORS

Dallas T. Hurd, Burnt Hills, N. Y., assignor to General Electric Company, a corporation of New York Application September 20, 1952, Serial No. 310,577

7 Claims. (Cl. 174—120)

The present invention relates to the insulation of electric conductors with chosen resinous material. The object of this invention is to provide conductors of improved toughness and wear-resistivity and, particularly, improved stability at elevated temperatures.

In accordance with the present invention electrically insulated conductors of improved wear and aging characteristics have been provided by the provision of a superior form of black copper oxide film for bonding the resinous insulating sheath to the cupreous surface of the conductor. The improved black copper oxide film is produced by an electrolytic oxidizing effect on copper conductors as described and claimed in my copending application, Serial No. 310,576, filed concurrently herewith, which is assigned to the same assignee as to the present application.

One of the advantages accruing from the electrolytic oxidation of the copper conductor, as compared with the production of a film of black copper by conventional oxidation, resides in the physical superiority of such film as a barrier and anchor between the cupreous surface of a conductor and a sheath of insulation. Films of copper oxide produced by the effect of air or gaseous oxygen upon copper at elevated temperatures are virtually worthless for such insulation purposes. Films produced by gaseous oxygen can not be developed to thicknesses sufficient to provide adequate barrier action for a resinous sheath without becoming brittle, inflexible, and only loosely adherent to the surface of this metal. Oxide films prepared by chemical oxidation of copper in aqueous alkaline solution by an oxidizing medium, such as sodium chlorite exhibit good flexibility and adherence to the base metal, even on very sharp deformation; thus, films of these types are suitable for use on electrical conductors. Unexpectedly, however, oxide films produced by anodic oxidation in an electrolyte are superior as substrates to those produced by chemical oxidative processes. For example, in comparing the gain in weight of two samples of copper wire, both of the same dimensions, one coated with a layer of anodic oxide and the other with an equal thickness of oxide produced by chemical oxidation in alkaline solution, and both heated in air at 250° C., it was observed that the rate of additional oxidation, i. e., combination with atmospheric oxygen, of the chemically coated wire was about 40% greater than that of the anodically coated wire.

A major advantage in employing a copper oxide coating on an electrical conductor as a substrate for an overlying resinous insulation resides in the protective action of the oxide layer as a barrier to prevent or inhibit both further oxidation of the conductor and the deterioration of the resinous insulation coating by the deleterious chemical action of metallic copper. Both chemical effects are known to occur in electrical apparatus operated at elevated temperatures, and the inhibition of which will depend on the lack of porosity, as well as the thickness, of the oxide film.

The reproducibility of an anodic black oxide film, the rapidity of its production and its adaptability for the continuous treatment of wire of indefinitely long length are advantageous features. Thus, for example, in an anodizing treatment of about two minutes duration it is possible to form a layer of black anodic copper oxide equivalent in thickness to an oxide layer which could be produced by the chemical oxidative process only in about twenty minutes. The protective action of an oxide barrier layer on a copper conductor will depend in part at least on the thickness of such layer, as well as on its porosity.

Figure 2:

In the accompanying drawing Fig. 1 is a conventionalized side view, of an apparatus for anodically oxidizing copper wire; and Fig. 2 is a fragmental view, partly in section, of coated anodized wire.

In carrying out my invention copper conductors, as an example, are annealed by heat treatment and carefully cleaned to remove adherent foreign matter, for example, by conducting the copper through alkaline and/or acid cleaning solutions as is well understood. A clean copper conductor 2 is led progressively and continuously as shown in Fig. 1 through a plurality of electrolytic cells 3 arranged sequentially end to end. As described more fully in my copending application, Serial No. 310,576, the wire to be oxidized functions as anode the oxide being progressively built in the succession of electrolytic cells. The cells contain a suitable electrolyte 4, as for example, aqueous sodium or potassium hydroxide, which is heated to an elevated temperature in an electrically heated tank 5 connected to the cells by a conduit 6 containing a pump 7 and a check valve 8. Each cell is provided with a cathode which may be constituted by a metal housing for the cell. Circuit connections and voltage regulating means are provided whereby unidirectional current from a suitable source (not shown) may be conducted in each cell between the wire anode and the respective cell cathode, through respective conductors 9 and individual regulable resistors 10. The voltage between the wire anode and the cathode in the cell first traversed by the wire, and in which the oxidative process is initiated should be relatively low, usually about 0.4 to 0.5 volt. In cells subsequently traversed by the wire the voltage between the wire anode and the cell cathodes should remain at a value at which anodic oxidation progresses normally, the voltage ordinarily rising progressively from one cell to another to about 1.3 volts, the specific voltages depending on the size of the wire and other conditions, including the speed of the wire and the rate at which the anodization is effected. When oxidation is substantially complete, the oxide coating is subjected to a higher voltage, ordinarily from about 1.3 to 2.0 volts, to consolidate the oxide coating and to improve the suitability of the oxide coating for its function as a substratum for insulating resinous coatings. In general the initial voltage is about 0.4 volt, rises fairly rapidly to about 0.9 volt and rises very little in a relatively long intermediate period. In the very last few cells the rise of voltage is more rapid.

Although reference has been made herein to combination of resin and a body of copper, it should be understood the present invention may be applied to other metals by first providing such metal with an external layer or coating of copper. For example, bodies of iron, steel nickel or other non-cupreous metal may be plated electrolytically with copper, also a non-cupreous metal may be coated mechanically with copper by methods known in the art. A copper-coated wire or other copper object may be electrolytically treated to produce thereon an anodic black copper oxide film which in turn is coated with resin as herein described. Reference to a copper body or wire in the appended claims should be taken to include also a body of wire, having a copper surface but otherwise consisting of other metal.

Copper oxide coatings thus produced generally are deep black occasionally exhibiting a greenish-to-brownish hue and constitute a mixture of cuprous and cupric oxides, possibly hydrated to some extent or containing copper hydroxides. The copper oxide thus produced, which for convenience will be referred to as anodic black copper oxide, enters into some sort of combination, either physical or chemical, or possibly both physical and chemical, with resinous coatings applied thereon. One advantageous effect realized is a remarkable improvement in the toughness and abrasion-resistance of such coatings. The black copper oxide also serves to protect the resinous overlay from the deleterious effects of metallic copper at elevated operating temperatures such as may be encountered in the operation of electrical apparatus. The oxide film also acts to protect the copper conductor from oxidation by atmospheric oxygen at elevated operating temperatures.

Various forms of resinous and plastic materials, including both thermoplastic and heat-convertible resins, may be applied by conventional wire coating methods on the copper conductors coated with adherent black copper oxide. Included among such insulations are so-called fluorocarbon resins, polysiloxane resins, polyamide resins, vinyl resins, polyester resins, vinylacetal resins, alkyd resins, and mixtures of such compounds.

The thickness or weight per unit area of oxide film 12, Fig. 2 necessary to provide an adequate barrier action for a resinous film of insulation 13 will depend in part on the chemical sensitivity of the particular insulating material to the deleterious action of copper at elevated temperatures as well as on the particular temperature to which the composite insulated conductor will be subjected in the operation of the electrical apparatus in which it is incorporated. Thus, for example, a minimal weight of from 0.3 to 0.5 milligram of anodic copper oxide per square centimeter of conductor surface appears to afford adequate stability to a resinous overlay of organopolysiloxane resin for extended periods at temperatures up to about 200° C. Similarly, a minimal weight of about 1.5 milligrams of anodic copper oxide per square centimeter of conductor surface will provide adequate long-time stability at 175° C. to a resinous overlay of polytrifluoromonochloroethylene, or to a methylphenyl polyorganosiloxane insulating sheath for extended periods at 250° to 300° C.

The reinforcing and adhering action that the film of anodic copper oxide imparts to an overlying sheath of resinous material will depend both on the particular resinous material and on the thickness or weight per unit area of the film of oxide. For many insulating materials, including fluorocarbons, and certain organopolysiloxanes, it is desirable that the film have a minimal weight of at least 0.8 to 1.0 milligram of oxide per square centimeter of conductor surface in order to provide adequate adherence and reinforcing action. It will be appreciated that this is not a fixed limit; if less reinforcement is necessary with a particular resinous sheath a lower minimal film thickness will afford satisfactory adhesion. On the other hand, it generally seems unnecessary to employ film thicknesses much in excess of those represented by about 2.0 to 2.5 milligrams of oxide per square centimeter of conductor surface as the adhesion and reinforcing effect is not greatly enhanced by increasing the coating thickness above a certain maximum thickness of oxide.

All resinous insulating materials appear to be sensitive in some degree to the deleterious effect of copper at elevated temperatures, (for example, 150° to 350° C.) particularly halocarbons, for example, polytrifluoromonochloroethylene, and the protective barrier action appears to be the more important function of the anodic oxide film although the reinforcing and adhering action also is significantly important. For some materials, such as the vinyl acetals or certain of the organopolysiloxanes, the action of the oxide film to reinforce the resinous sheath and to increase its abrasion resistance may be the more important function of the anodic oxide film, particularly since such materials may be employed in apparatus where only moderately elevated temperatures are encountered or where temperatures in excess of 125–150° C. may be encountered only seldom; in such cases, however, the barrier action of the anodic oxide film is of considerable significance in that it provides a reserve of protection against overload or other conditions which are known to cause a serious rise in the temperature of electrical apparatus in service.

Again, for the manufacture and use of apparatus incorporating conductors insulated with particular types of organopolysiloxanes for very high temperature operation, e. g. 200–350° C. both the reinforcing effect and the barrier action of the oxide film may be of primary importance, the former in providing sufficient mechanical strength to the insulated conductor to allow fabrication of the apparatus, and the latter to afford protection both to the insulating sheath and to the conductor at the elevated operating temperatures.

Specific examples of thermoplastic fluorocarbons are polymerized fluorinated ethylene compounds, as for example, tetrafluoroethylene (F–1114) and monochlorotrifluoroethylene (F–1113). Aqueous dispersions of polytetrafluoroethylene sold by E. I. Du Pont de Nemours & Co. as Teflon Wire Enamel (852–001) contain about 60% solids. Preparation of such compositions is described in U. S. Patent 2,478,229—Berry. Such resinous materials may be applied, for example, by dipping the wire into the aqueous dispersion, or by electrophoresis in an aqueous emulsion, followed by a heat process to dry and sinter the thermoplastic fluorocarbon.

Other examples of a heat-convertible type of insulation which when applied on copper articles coated with anodic black oxide of copper are the plastic resinous compositions consisting of completely or of partially hydrolyzed vinyl esters reacted with an aldehyde as described in Patnode and Flynn, U. S. Patent 2,085,995 and Jackson and Hall Patent 2,307,588. In particular, such resinous materials which will be referred to herein as vinyl acetals when applied over a film of black copper oxide as herein described have greater resistance to distortion or abrasion upon subjection to mechanical disrupting forces, and increased stability at elevated temperatures (e. g. 150–200° C.), as compared with similar resinous material applied on bare copper surfaces. An improvement in the baking process employed for the curing of the insulating films also is effected by the presence of the anodic black copper oxide barrier. The resin when shielded from copper by a layer of anodic black copper oxide is less liable to be damaged by "overbaking," that is by subjection to unduly long time or unduly high baking temperature than when in direct contact with copper. This effect is particularly important with insulating resins of the polyvinylacetal type, or resins particularly sensitive to the effect of copper at elevated temperatures.

Organopolysiloxane resins, for example, methyl and phenyl chlorosilanes, either alone or combined when hydrolyzed, are described in Rochow, U. S. Patents, 2,258,218, 219, 220, 221, and 222, issued October 7, 1941, and Welsh U. S. Patent 2,449,572, issued September 21, 1948, commonly known as "silicone" resins, also are examples of heat-convertible resins which usefully may be applied over copper oxide coated copper. In particular mixed methylphenyl-polysiloxane resins containing an average of 1.2–1.8 total methyl and phenyl groups per silicon atom may be applied to the oxide-coated copper wire.

Similarly alkyd resins and organopolysiloxane resins modified with alkyd resins constitute still other examples of resinous materials which are suitable for application on copper wire oxidized in an alkaline medium. Specific examples of the latter resins are described in Doyle and Nelson U. S. Patent 2,587,295.

These various resinous insulations may be applied to copper conductors coated with anodic black oxide by conventional wire coating processes. The coated conductors are heat-treated by conventional processes to heat-convert or fuse the resinous material to a final state, satisfactory for use in the fabrication of electrical apparatus.

What I claim as new and desire to secure by Letters Patent of the United States is:

1. An insulated electric conductor comprising the combination of a base conductor having a cupreous surface, an adherent film thereon of anodic black copper oxide formed by anodization of said cupreous surface in an aqueous alkaline solution, and an adherent sheath of insulation thereon consisting of resinous material which is capable of adhering to said oxide film.

2. The combination of a copper conductor, an adherent film thereon consisting of black copper oxide which is produced by anodic oxidation in an alkaline aqueous electrolyte, and a heat-converted coating of resinous insulation external to said copper oxide film.

3. The combination of a conductor the surface layer of which consists of copper, an adherent film of copper oxide thereon formed by anodization of said copper surface layer in an aqueous alkaline solution, and having a weight of about 1.5 to 2.5 milligrams per square centimeter of conductor surface, and an adherent film of resinous insulation overlying and bonded to said oxide film.

4. The combination of a copper conductor, a sheath of resinous insulation enclosing said conductor, and a film of anodic black copper oxide interposed between said conductor and sheath and being bonded to said conductor and sheath, said film being produced by anodization of said copper conductor in an aqueous alkaline solution, the presence of said oxide film having the effect of materially increasing the abrasion resistance and heat stability of said sheath of insulation.

5. The combination of a body of copper, anodic black copper oxide coating said body and being integrally united with said copper, said oxide having been formed by the anodic oxidation of said body of copper in an alkaline aqueous solution, and a coating of organo polysiloxane resinous material applied upon said copper body in overlying relation to said oxide coating.

6. The combination of copper conductor, anodic black copper oxide coating said conductor, said oxide having been produced by anodization of said conductor in an aqueous alkaline solution, and electrical insulation external to said oxide coating, said insulation consisting of a resinous polyfluorocarbon resinous material which is capable of resisting elevated temperatures of about 150° to 200° C. without deterioration.

7. The combination of a copper conductor, a film of anodically-produced black copper oxide coating said conductor, said film having been produced by anodization of said copper conductor in an aqueous alkaline solution, and a coating of polyvinyl acetal resinous material enveloping said film of copper oxide.

References Cited in the file of this patent

UNITED STATES PATENTS

| | | |
|---|---|---|
| 2,364,993 | Meyer | Dec. 12, 1944 |
| 2,523,037 | Mathes | Sept. 19, 1950 |
| 2,542,069 | Young | Feb. 20, 1951 |
| 2,593,922 | Robinson et al. | Apr. 22, 1952 |

OTHER REFERENCES

McLean et al.: "Metal Finishing," June 1945, pages 247 and 248. (Copy in Div. 56.)